J. GALL.
Spectacles.

No. 163,648.

Patented May 25, 1875.

WITNESSES

INVENTOR

THE GRAPHIC CO.PHOTO-LITH.39 & 41 PARK PLACE,N.Y.

UNITED STATES PATENT OFFICE.

JOSEPH GALL, OF NEW YORK, N. Y.

IMPROVEMENT IN SPECTACLES.

Specification forming part of Letters Patent No. 163,648, dated May 25, 1875; application filed February 5, 1875.

*To all whom it may concern:*

Be it known that I, JOSEPH GALL, of the city of New York, in the county of New York and State of New York, have invented a new and useful Improvement in Spectacles; and I do hereby declare that the following is a full, clear, and exact description thereof, and of its construction and action, reference being had to the accompanying drawings, and to the letters of reference marked thereon, and making a part of this specification.

My invention or improvement consists in the peculiar construction of the eye-wires, or that part of the frame which surrounds and holds the glasses or lenses.

Figure 1:
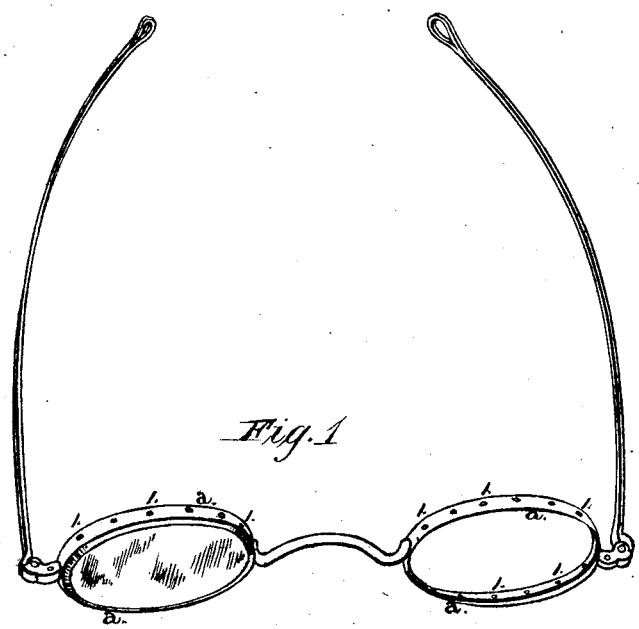
Figure 2:
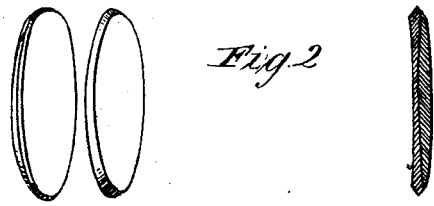

Figure 1 shows a pair of spectacles made according to my invention, and represented as if having but one glass in them. Fig. 2 shows a compound or achromatic lens, the glasses being shown separate and united, for which my improvement is particularly adapted.

The eye-wires $a$, which hold and support the lenses or glasses, are made broader than usual, so as to stand out or project toward the eye a little beyond the edge or general surface of the glass, and through such parts, near to the glass, are made a number, more or less, of small holes or perforations 1 1.

By the arrangement and use of such perforations there will be produced a slight continuous movement or passage of air across the inside surface of the glass, which has the effect to prevent or diminish the gathering of moisture upon the glass, as is often the case, and particularly when the eyes may be diseased, the effect of which is not only to dim the glass and obscure the vision, but also to strain the eyes more or less in using the glasses when in such condition. This is prevented or obviated to a great extent by my invention. The perforations referred to may also be made so as to be on each and both sides of the lenses or glasses.

Such construction of eye-wires may be advantageously used with any kind of glass or lens, but is considered more desirable in connection with compound lenses or glasses, which are so made and shaped relatively to each other that the light will be presented to the eye without chromatic aberration, or so that the lenses or glasses will be achromatic.

Such achromatic lenses I am now about introducing into use for spectacles and eye-glasses.

What is claimed is—

The lens-frame $a$, provided with perforations 1 1, substantially as described.

J. GALL.

Witnesses:
   S. D. LAW,
   A. T. GURLITZ.